(12) United States Patent
Weiner et al.

(10) Patent No.: US 7,245,346 B2
(45) Date of Patent: Jul. 17, 2007

(54) METHOD OF MAKING AN ELECTRONIC DISPLAY

(75) Inventors: Megan L. Weiner, Rochester, NY (US); Charles M. Rankin, Jr., Penfield, NY (US); John P. Macauley, Henrietta, NY (US); Theodore K. Ricks, Rochester, NY (US); Rusty J. Coleman, Hilton, NY (US)

(73) Assignee: Eastman Kodak Company, Rochester, NY (US)

(*) Notice: Subject to any disclaimer, the term of this patent is extended or adjusted under 35 U.S.C. 154(b) by 119 days.

(21) Appl. No.: 10/851,590

(22) Filed: May 21, 2004

(65) Prior Publication Data

US 2005/0259215 A1    Nov. 24, 2005

(51) Int. Cl.
*G02F 1/13*    (2006.01)

(52) U.S. Cl. ..................................... 349/187

(58) Field of Classification Search ............ None
See application file for complete search history.

(56) References Cited

U.S. PATENT DOCUMENTS

| | | | |
|---|---|---|---|
| 4,863,610 A * | 9/1989 | Campbell .............. 210/658 |
| 5,399,390 A * | 3/1995 | Akins .................. 428/1.62 |
| 5,506,668 A | 4/1996 | Guth |
| 5,532,810 A | 7/1996 | Cahill |
| 5,589,925 A | 12/1996 | Cahill |
| 5,659,865 A | 8/1997 | Zarbo |
| 5,670,202 A | 9/1997 | Guzowski et al. |
| 5,893,012 A | 4/1999 | Schubert et al. |
| 5,905,932 A | 5/1999 | Morse et al. |
| 6,029,039 A | 2/2000 | Aslam et al. |
| 6,136,141 A | 10/2000 | Glatfelter et al. |
| 6,208,827 B1 | 3/2001 | Aslam et al. |
| 6,469,757 B1 | 10/2002 | Petruchik |
| 6,470,782 B1 | 10/2002 | Shimotoyodome et al. |
| 6,564,030 B2 | 5/2003 | Baughman et al. |
| D478,383 S | 8/2003 | Timm et al. |
| 6,678,496 B1 | 1/2004 | Aslam et al. |

* cited by examiner

*Primary Examiner*—David Nelms
*Assistant Examiner*—Michael H. Caley
(74) *Attorney, Agent, or Firm*—Kathleen Neuner Manne; Lynne M. Blank

(57) ABSTRACT

A display formed by skiving with a skiving device including at least one nozzle tip and at least one roller is described. The display has skives that are clean and neat, and has no damage to layers underlying the skived areas.

11 Claims, 11 Drawing Sheets

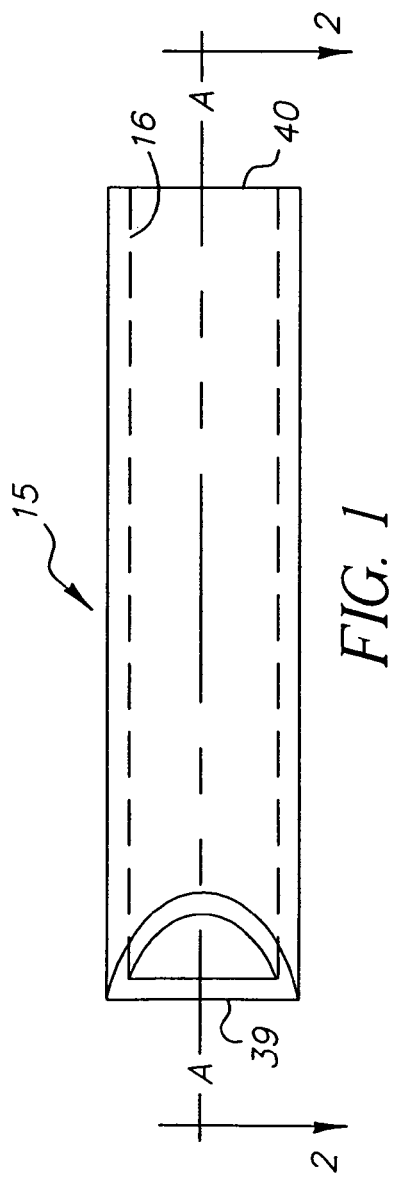
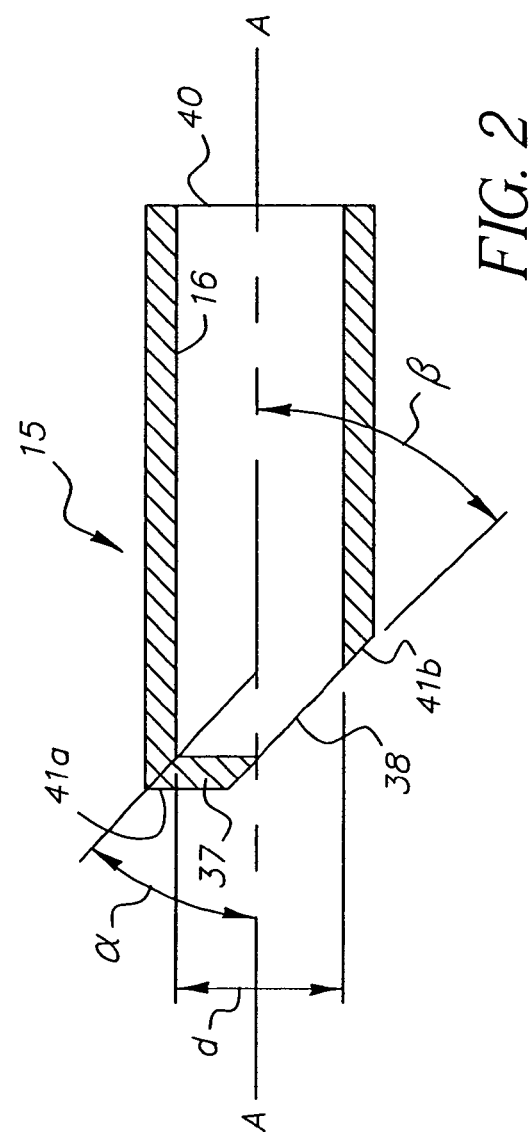
FIG. 1
FIG. 2

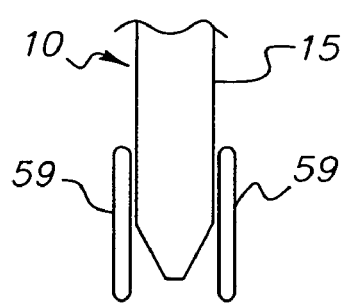
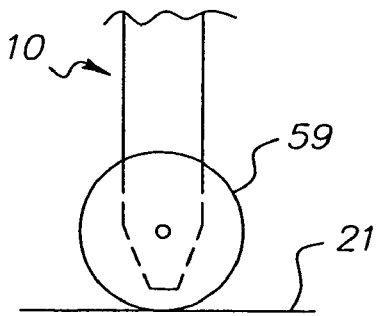
FIG. 7A    FIG. 7B
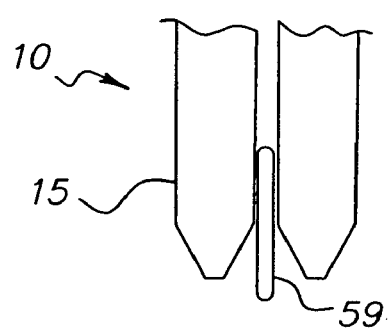
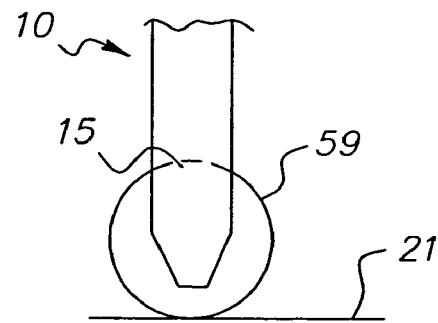
FIG. 7C    FIG. 7D
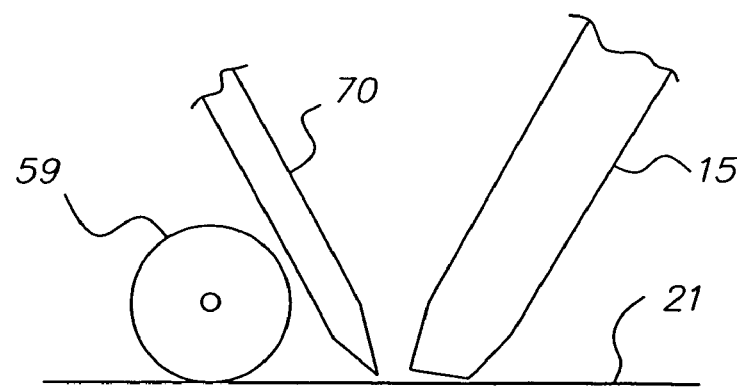
FIG. 7E

METHOD OF MAKING AN ELECTRONIC DISPLAY

CROSS REFERENCE TO RELATED APPLICATIONS

Cross-reference is made to related, co-filed application Ser. Nos. 10/851,560 and 10/851,451 to Axtell et al., co-filed application Ser. No. 10/851,492 to Weiner et al., and co-filed application Ser. Nos. 10/851,913 and 10/851,439 to Rankin et al.

FIELD OF THE INVENTION

A skiving device including at least one nozzle tip and at least one roller, and methods for selectively removing material using the skiving device, are presented.

BACKGROUND OF THE INVENTION

Often in manufacturing processes, a material, or a portion of a material needs to be removed before further processing steps can occur. Such material removal can be referred to as "skiving." Various methods of skiving or material removal are known in manufacturing processes.

U.S. Pat. No. 6,678,496 discloses a mechanism for skiving fuser rollers using skive assemblies including elongated, thin, flexible members that scrape material from the fuser apparatus roller. An air plenum with a nozzle arrangement provides positive airflow to ensure that the fuser apparatus roller is fully stripped. The skiving assembly as described in this patent scrapes the material away, and any remaining material is removed by airflow from the nozzle.

It has been shown in U.S. Pat. Nos. 5,532,810; 5,589,925; and 6,029,039 that elongated skive fingers of limited flexibility mounted in particularly configured support bodies substantially prevent damaging flex of the skive fingers. In these skive mechanisms, the support bodies support a major portion of the skive fingers and pivot into engagement with the fuser roller to limit skive finger flexing when engaged by a material to be skived, typically from a roller. The skive fingers can be retractable to prevent damage by jammed materials.

U.S. Pat. No. 5,670,202 discloses a technique for selectively applying materials in a pattern by spraying and then collecting the excess materials using adjustable skive manifolds on each side of the spray pattern, which function to vacuum off the edges of the airless spray pattern. The system utilizes a robot manipulator, a masking tool assembly, and other hardware, to recover material sprayed and skived by the masking tool assembly.

U.S. Pat. No. 6,564,030 discloses a fuser station with a vented skive assembly for an image-forming machine. The image-forming machine has a photoconductor, a primary charger, an exposure machine, a toning station, a transfer charger, and a vented fuser station. The fuser station may include a pressure roller, a fuser roller, and a skive assembly. The skive assembly has rib sections forming one or more slots, which are configured to provide an airflow pattern to reduce condensation.

U.S. Pat. No. 6,136,141 discloses fabrication of lightweight semiconductor devices including removal of a substrate from a support member utilizing a beam of radiant energy. The substrate is skived from the support member without damage to the semiconductor device. This method can be implemented on a continuous, roll-to-roll basis wherein the substrate and support member each comprise an elongated web, and wherein the webs are continuously advanced through a plurality of deposition chambers and the skiving area.

U.S. Pat. No. 6,469,757 discloses a technique for selectively removing a liquid crystalline material layer from a multi-layered substrate. The liquid crystalline material was coated and dried on the substrate, then a nozzle tip was used to remove the liquid crystalline material from the substrate, as it was moved on a rotating drum past the nozzle in a batch process. To remove all the desired material using this nozzle, multiple nozzle passes may be needed, prohibiting roll-to-roll processing. It has been found that harder materials, for example, cross-linked materials, cannot be skived with this process.

It would be advantageous to have a means of removing any amount of material, from a portion of a layer to more than one layer of material, in a batch or a roll-to-roll (continuous) manufacturing process. Further, a method and apparatus capable of removing materials of varying hardness, for example, solvents (including water), metal, gelatin, liquid crystal, polymers, ceramics and pulp, is desirable.

SUMMARY OF THE INVENTION

A display comprising a substrate is described, wherein the display is formed by providing the substrate to a skiving device comprising at least one roller having a surface and at least one nozzle tip; contacting the surface of at least one roller and at least one nozzle tip with the substrate; and moving the device in relation to the substrate to skive at least a portion of the substrate in contact with at least one roller, at least one nozzle tip, or both, wherein the substrate comprises a light modulating material.

ADVANTAGES

A skiving device as described herein is suitable for skiving materials of all types, from soft coatings to hard materials such as metal, cross-linked polymers, or dried materials. The skiving device is capable of removing from a portion of a layer to more than one layer of material in a single pass. The skiving device can be used in a batch or a roll-to-roll process. Single- or multiple-pass skiving can be done. Because a combination of rollers and nozzle tips is used in the skiving device, unique skive profiles can be achieved. The display formed with the skiving device has skives with clean, neat edges, and is undamaged below the skived areas.

BRIEF DESCRIPTION OF THE DRAWINGS

The invention can be understood with reference to the detailed description below and the accompanying figures, as follows:

FIG. 1 is a view of a nozzle tip;

FIG. 2 is an enlarged cross-sectional view of the nozzle tip of FIG. 1 along section line A-A;

FIGS. 7A and 7B are a front and side illustration of a combination of a nozzle tip with two rollers;

FIGS. 7C and 7D are a front and side illustration of a combination of a roller with two nozzle tips;

FIG. 7E is a side illustration of a combination of a roller, a solvent nozzle, and a nozzle tip;

DETAILED DESCRIPTION OF THE INVENTION

Figure 3:
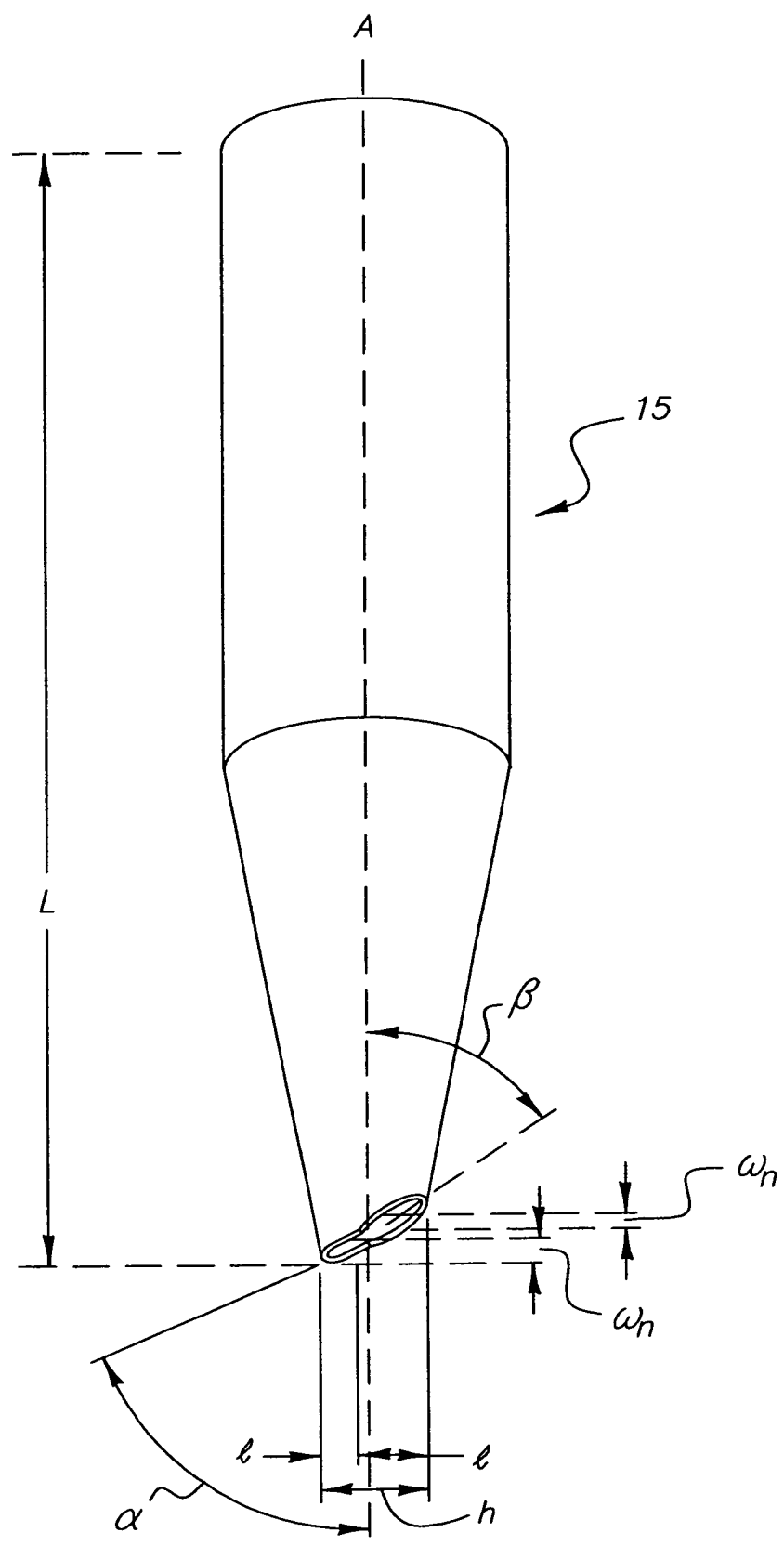
FIG. 3 depicts a nozzle tip configuration.

The present invention is directed to a display made with a skiving device. The device and method can be useful in the manufacture of various materials, including, for example, graphic arts, metal working, paper molding, food processing, imaging and display materials, display devices, electronic devices, and other coated materials. Unique skive profiles can be achieved under various manufacturing conditions because the skiving device combines one or more roller with one or more nozzle tip as described herein.

"Skiving" is the controlled removal of at least a portion of one or more layers. As used herein, skiving is done by a combination of at least one roller and at least one nozzle tip, alone or in combination with other material removal methods. The removal or patterning of the material can be by cutting, displacement, or a combination thereof.

"Substrate" as used herein is one or more layers, which can be the same or different composition. The substrate can be skived to remove material therefrom.

"Material" as used herein refers to the portion of the substrate that is removed, or intended to be removed, by skiving.

The skiving device can include at least one nozzle tip and at least one roller in any configuration. For example, one or more roller can contact a substrate before the nozzle tip, after the nozzle tip, or simultaneously with the nozzle tip. One or more roller and one or more nozzle tip can be arranged in line in the direction of movement of the substrate, in line in a direction not parallel the direction of movement of the substrate, adjacent, or staggered in one or more directions with respect to the movement of the substrate. Each nozzle tip and roller can be at the same or different height from the substrate as every other nozzle tip or roller. As used herein, a "grouping" refers to a combination of at least one roller and at least one nozzle tip.

A nozzle tip useful for the skiving device is shown in FIGS. 1 and 2. The nozzle tip 15 can include a proximal end 39, and a distal end 40. An opening 16 extends along a longitudinal axis (line A-A) from the proximal end 39 to the distal end 40. As shown in FIG. 2, the proximal end 39 can have an opening defined by a first face 37 and a second face 38. The first face 37 can be angled, for example, at an angle α from 20 degrees to 120 degrees relative to the longitudinal axis A-A. The second face 38 can be angled, for example, at an angle β from 15 degrees to 75 degrees relative to the longitudinal axis. According to certain embodiments, the angle of the first face or second face, independently, can be 0 or 90 degrees. According to certain embodiments, the angle α of the first face 37 is greater than the angle β of the second face 38. The angles α and β are measured from the longitudinal axis A-A to the outermost edge of the first face 37 or the second face 38, respectively, as shown in FIG. 2.

The first face edge 41a, the second face edge 41b, or both can be beveled to reduce the surface area of the cutting or skiving surface of the nozzle tip 15. Reducing the surface area of the nozzle tip 15 can aid in producing a cleaner cut through a substrate, and can reduce friction. According to certain embodiments, the edge of either the first face or the second face can be beveled toward the opening 16. This can aid in channeling skived material through the opening 16 in the nozzle tip 15 for disposal. The first face edge 41a, the second face edge 41b, or both, can form a parabolic shape. The shape of the first face edge 41a and the second face edge 41b can be the same or different. The first face 37 can have a height equal to or greater than the height of the material to be removed. According to certain embodiments, the height of the second face 38 can be equal to or greater than the height of the first face 37.

In use, the first face edge 41a can be placed at a first height $h_1$ from a support to remove material from the substrate carried on the support. The material can include one or more compositions in one or more layers or portions of a layer. The area from which the material has been removed is referred to as a chasm. The first face edge 41a can contact the material before the second face edge 41b. The second face edge 41b of the nozzle tip 15 follows the first face edge 41a at a second height $h_2$ from the support. The second face edge 41b can be at the same height from the support as the first face edge 41a, further from the support, or closer to the support, depending on the desired purpose of the second face edge 41b. If the second face edge 41b is at about the same height from the support as the first face edge 41a, the second face edge 41b can remove any remaining material missed by the first face edge 41a, clean the edges of the chasm, or widen the chasm. If the second face edge 41b is further from the support than the first face edge 41a, the second face edge 41b can remove material loosened by the first face edge 41a, and smooth or widen the upper edges of the chasm. If the second face edge 41b is closer to the support than the first face edge 41a, the second face edge 41b can remove material missed by the first face edge 41a, remove an additional amount of material, and form the edges defining the chasm. The angle of intersection of the first face edge 41a and the second face edge 41b can be designed such that the nozzle tip does not gouge, scratch, or remove material below the desired height.

The opening at the proximal end of the nozzle tip can extend along the longitudinal axis of the nozzle tip from the proximal end to an exit port at the distal end, or to an exit port near the distal end of the nozzle tip. The opening can be circular, ovoid, elliptical, square, rectangular, polygonal, or any other suitable shape. According to certain embodiments, the opening can be circular or ovoid. The opening can change shape as it progresses from the proximal end to the distal end of the nozzle tip. The opening can maintain a constant diameter from the proximal end to the exit port, or the diameter can vary at any point along the length of the opening. As used herein, the diameter of the opening is defined as the longest distance d along a perpendicular line from the interior of the first face edge 41a to the interior of the second face edge 41b, as shown in FIG. 2. According to certain embodiments, the diameter of the opening can widen or narrow as it nears the exit port, forming a conical opening. The diameter of the opening can widen as it nears the exit port or distal end. The opening can change diameter at some point between the proximal end and the distal end from a first constant diameter to a second constant diameter, with or without a gradual change between diameters. The nozzle tip opening at the proximal end can have a diameter of from 0.1 to 50 millimeters, for example, 0.1 to 20 millimeters, 1 to 8 millimeters, or 1.5 to 5 millimeters. Depending on the intended use of the nozzle tip, the diameter of the opening at the proximal end can be larger than 50 millimeters, or less than 0.1 millimeters.

As shown in FIG. 3, the nozzle tip can have a length "L" measured from the first face of the nozzle tip to the distal end of the nozzle tip. The first face angle α, and the second face angle β can be measured as described previously herein. The width of each face can be measured across each face in a direction perpendicular to the direction of web movement, as shown by "$w_n$." The face length can be measured across each face in the direction of web movement, as shown by "l." The height "h" of the first face can be measured from the surface of the substrate to the outer edge of the first face. The height of the second face can be 0 where at least one portion of the second face touches the substrate. According to certain embodiments, the height of the first face can be 0 and the height of the second face h. The total nozzle tip area is the combined area of both faces of the nozzle tip.

The nozzle tip can be made of a material that is machinable, forgeable, moldable, or a combination thereof. The nozzle tip can be metal, ceramic, glass, polymeric, a composite material, or can include one or more of the above materials. Wherein the nozzle tip is polymeric, the nozzle tip can include acetal polyoxymethylene, polyethylene, polypropylene, a fluoropolymer, or a combination thereof. Exemplary material can include acetal polyoxymethylene in the form of Delrin® from E. I. Dupont de Nemours and Company, Delaware, or a fluoropolymer such as Teflon®, also from E. I. Dupont de Nemours and Company. The nozzle tip, or a portion thereof, can be coated. The coating can be on one or more face edge, along the opening, on the outside of the nozzle tip, or a combination thereof. Multiple coatings can be used, simultaneously in one location, or on different parts of the nozzle tip. Suitable coating materials can increase durability, reduce friction, prevent wear, or provide other desirable mechanical properties to the nozzle tip. For example, to increase wear and reduce friction, fluoropolymers such as Teflon® or acetal resins such as Delrin® can be used. According to certain embodiments, the nozzle tip can be a composite, including more than one material. The nozzle tip can include two or more parts forming the nozzle tip when joined. Each of the parts can be the same or a different material from at least one other part.

A roller useful in the skiving device can have two sides and a face. The roller can be made of a machinable material, a moldable material, or a combination thereof. For example, the roller can be metal, such as stainless steel; ceramic; glass; or a polymer. The roller can be acetal polyoxymethylene, polyethylene, or polypropylene. The roller, or a portion thereof, can be a combination of two or more materials. For example, the roller can be manufactured of one material, and a second material can be applied to the first material to form all or a portion of the roller face.

At least a portion of the roller face can be coated with a material suitable for increasing durability, reducing friction, preventing wear, or providing other desirable mechanical properties to the roller during use, wherein the roller interacts with a substrate to remove material from the substrate. For example, to increase wear and reduce friction of the roller face, fluoropolymers such as Teflon®, or acetal resins such as Delrin®, both from E. I. Dupont de Nemours and Company, can be used.

Figure 4A:
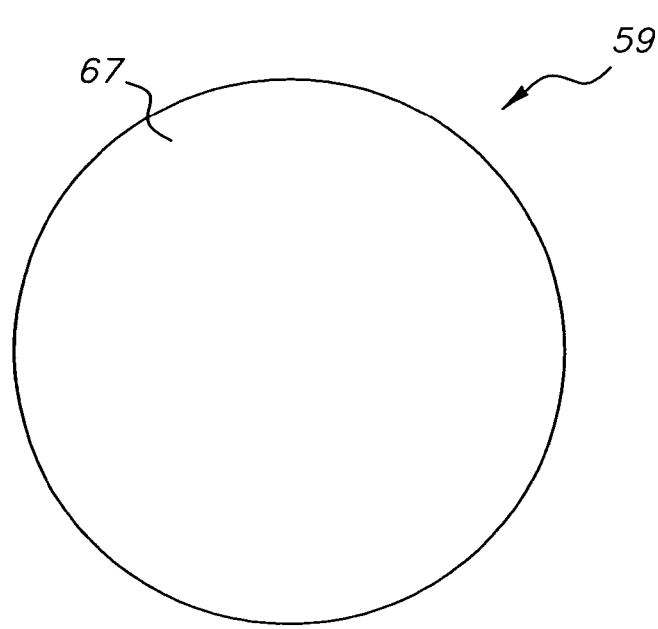
FIGS. 4A-4H illustrate various roller profiles.

As shown in FIG. 4A, the shape of the roller 59 refers to the shape of a side 67. The roller shape can be round, ovoid, elliptical, or any other suitable shape. The roller shape can be symmetrical. Polygonal shapes can be used, for example, a triangle, hexagon, octagon, dodecagon, and the like. Irregular but rotable shapes can be used for the roller. The roller can be rotable around an axis. The shape of the roller can effect the resulting skive depth and regularity of the skive.

As shown in FIGS. 4B-4H, the roller face 68 can have various configurations. For example, the roller face 68 can be squared, radiused, chamfered, beveled, convex, concave, parabolic, a chevron, or patterned. The face can have a surface including a central portion and two side portions. According to certain embodiments, at least one of the side portions can be longer than the central portion. At least one of the side portions can be shorter than the central portion. Each of the side portions and the central portion can be the same or different lengths. Each side portion independently can be squared, chamfered, radiused, beveled, concave, convex, parabolic, or patterned. The side portions can be identical. The side portions can be mirror images of each other. The roller face can include one or more channel separating the face into two or more sections.

Figure 4B:
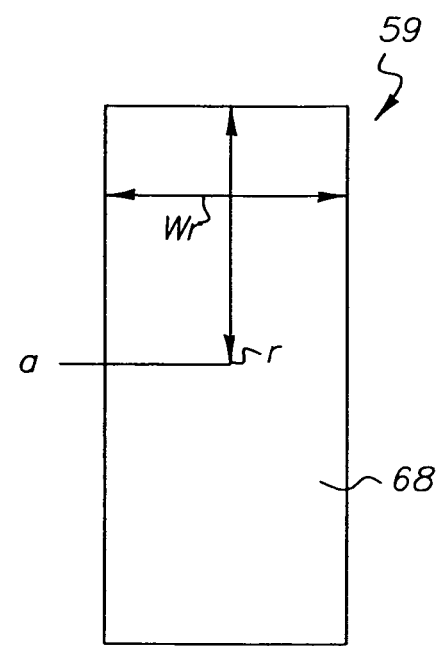

As shown in FIG. 4B, the roller face 68 can be squared, wherein the surface of the face 68 intersects the side 67 at an angle of about 90 degrees.

Figure 4C:
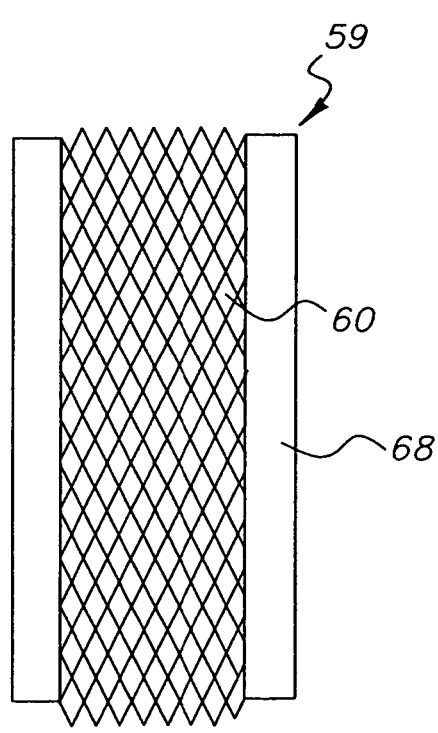

As shown in FIG. 4C, the face 68 can be patterned. The patterning 60 can extend across all or only a portion of the face 68. More than one pattern 60 can be present on the face 68. A patterned face 68 can be combined with any other configuration. At least a portion of the pattern of the face 68 can be transferred to the substrate during skiving.

Figure 4D:
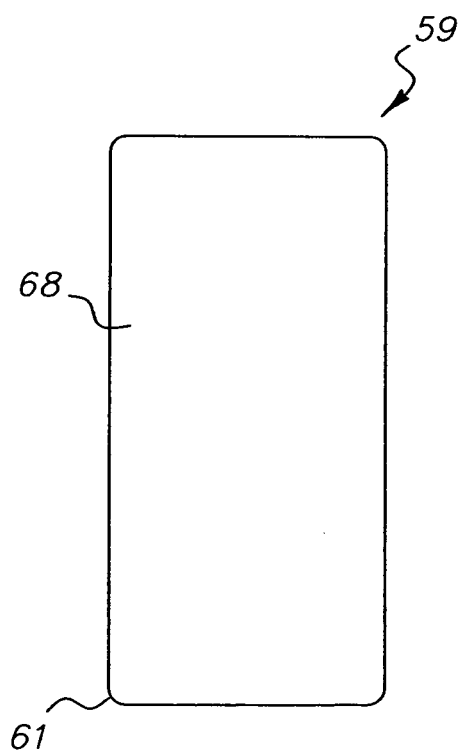

As shown in FIG. 4D, the roller face can be radiused, such that the roller face 68 is curved at least at a portion of the roller face 61 intersecting the roller side 67. All or a portion of the roller face can be curved.

Figure 4E:
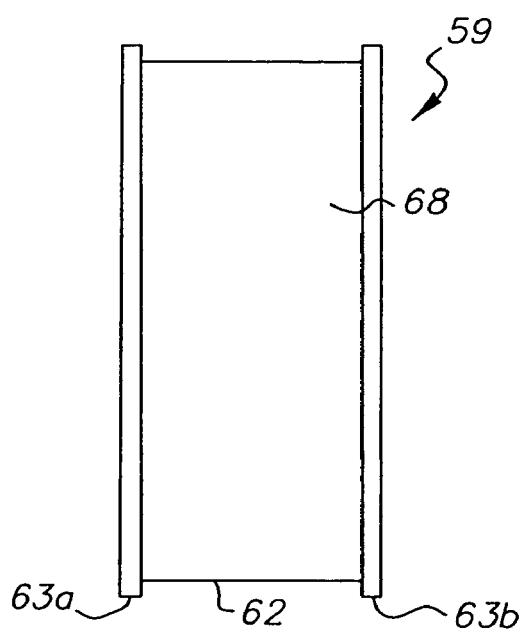

As shown in FIG. 4E, the roller face 68 can be undercut, wherein the roller face 68 has a central portion 62 and two side portions 63a and 63b, and the side portions 63a and 63b are longer than the central portion 62. A roller face 18 can also have a central portion longer 62 than the side portions 63a and 63b. The side portions 63a and 63b can be the same or different lengths.

Figure 4F:
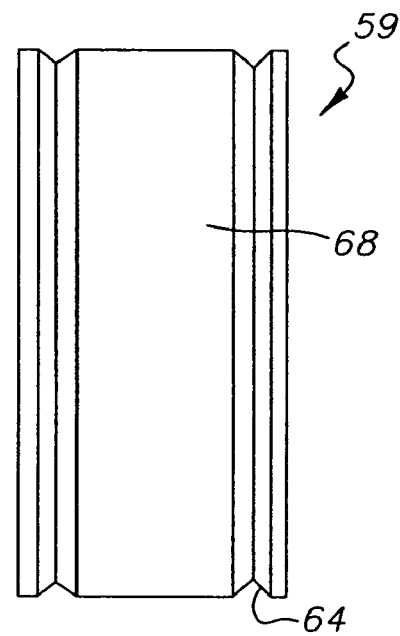

As shown in FIG. 4F, the roller face 68 can have at least one channel 64 separating the roller face 68 into two or more sections. The channel 64 can be concave, angled, a chevron, curved, or parabolic. The channel 64 can be symmetrical or asymmetrical. The depth of the channel 64 can be determined based upon the desired effect. The channel 64 can be sufficiently deep to aid in removal of skived material. The channel 64 can be shallow enough to skive or pattern the substrate with which the roller 59 is in contact.

Figure 4G:
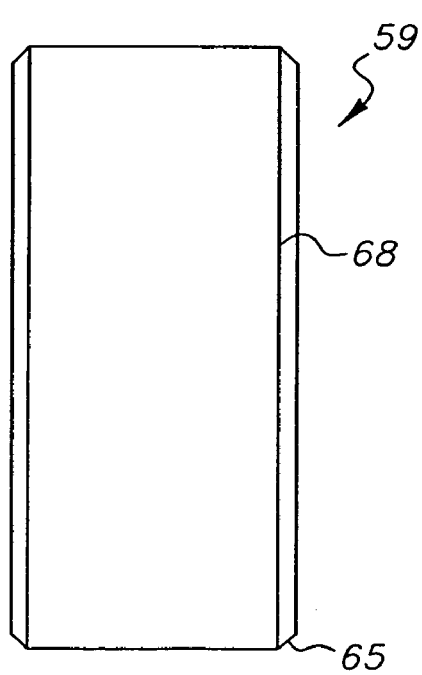

As shown in FIG. 4G, one or more edge 65 of the roller face 68 can be chamfered. The angle of the chamfer can be between 0 and 90 degrees.

Figure 4H:
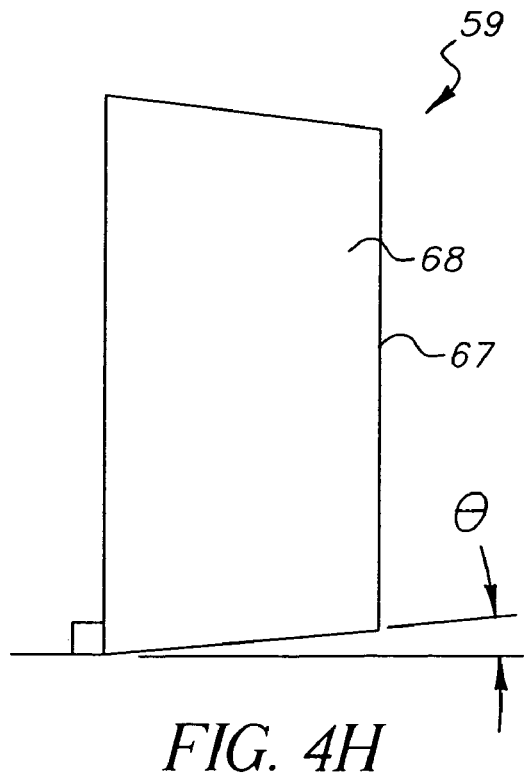

As shown in FIG. 4H, the surface of the roller face 68 can be beveled. All or a portion of the roller face 68 can be beveled. According to certain embodiments, the roller face 68 can have one or more beveled areas, forming a chevron, a point, a stepped surface, or other angled surface. The angle θ of the bevel can be from 0 to 90 degrees, for example, from 0 to 60 degrees, from 0 to 45 degrees, less than 30 degrees, less than 20 degrees, less than five degrees, or less than one degree, wherein the angle is measured from a line perpendicular to the roller side 67, as shown in FIG. 4H.

The roller can be configured so that the roller shape and configuration of the roller face minimizes contact area with the substrate. Reducing the contact surface area can reduce friction between the roller face and the substrate. The contact surface area between the roller face and the substrate can be large enough to create friction sufficient to rotate the roller about an axis during skiving. The roller can be configured to increase the cutting efficiency of the roller face. The roller can be configured to reduce or prevent material retention by the roller. The roller can be configured to provide minimal or no damage to the structure of the unskived portion of the substrate.

Two or more rollers can be joined by a common axis for use in a device or assembly. Each roller commonly joined can have the same or different profile. The rollers can be of one material, for example, a single mold can be used to form the rollers and axis. The axis of rotation for each roller can be an axle. The axis of rotation can include ball bearings or other materials suitable for enabling rotation of the roller about the axis. The axis of rotation can be at least partially enclosed, for example, by the housing. Each roller can independently be rotable about its axis. Each roller independently can be freely rotable, turning by friction between the roller surface and the substrate. Each roller independently can be motor-driven, such that the motor controls the speed of rotation of the roller, irrespective of the movement of the substrate. The speed at which the roller rotates about the axis can be the same as the speed of the substrate movement.

The width and diameter of the roller can vary depending on the application. The width "$w_r$" of the roller is a measurement of the roller from side to side across the widest portion of the roller face, as shown in FIG. 4B. The radius "r" of the roller is the longest measurement from an axis of rotation "a" to the face, as shown in FIG. 4B. According to certain embodiments, the roller can have a width of 0.1 millimeters to 2 meters, for example, from 0.5 meter to 1 meter, less than 0.5 meter, or from 2 to 8 millimeters. Smaller or larger widths can be used depending on the application. The width of the roller can be smaller, larger, or the same as the radius or as the diameter of the roller.

A ratio of a nozzle tip internal diameter to a width of an associated roller, such as in a grouping, can vary depending on the desired effect in the skived substrate. The internal diameter of the nozzle tip can be smaller than, equal to, or larger than the width of the roller. According to certain embodiments, the ratio of the internal diameter of the nozzle tip to the roller width can be 1:1 or greater, for example, at least 1.25:1.

Figure 5:
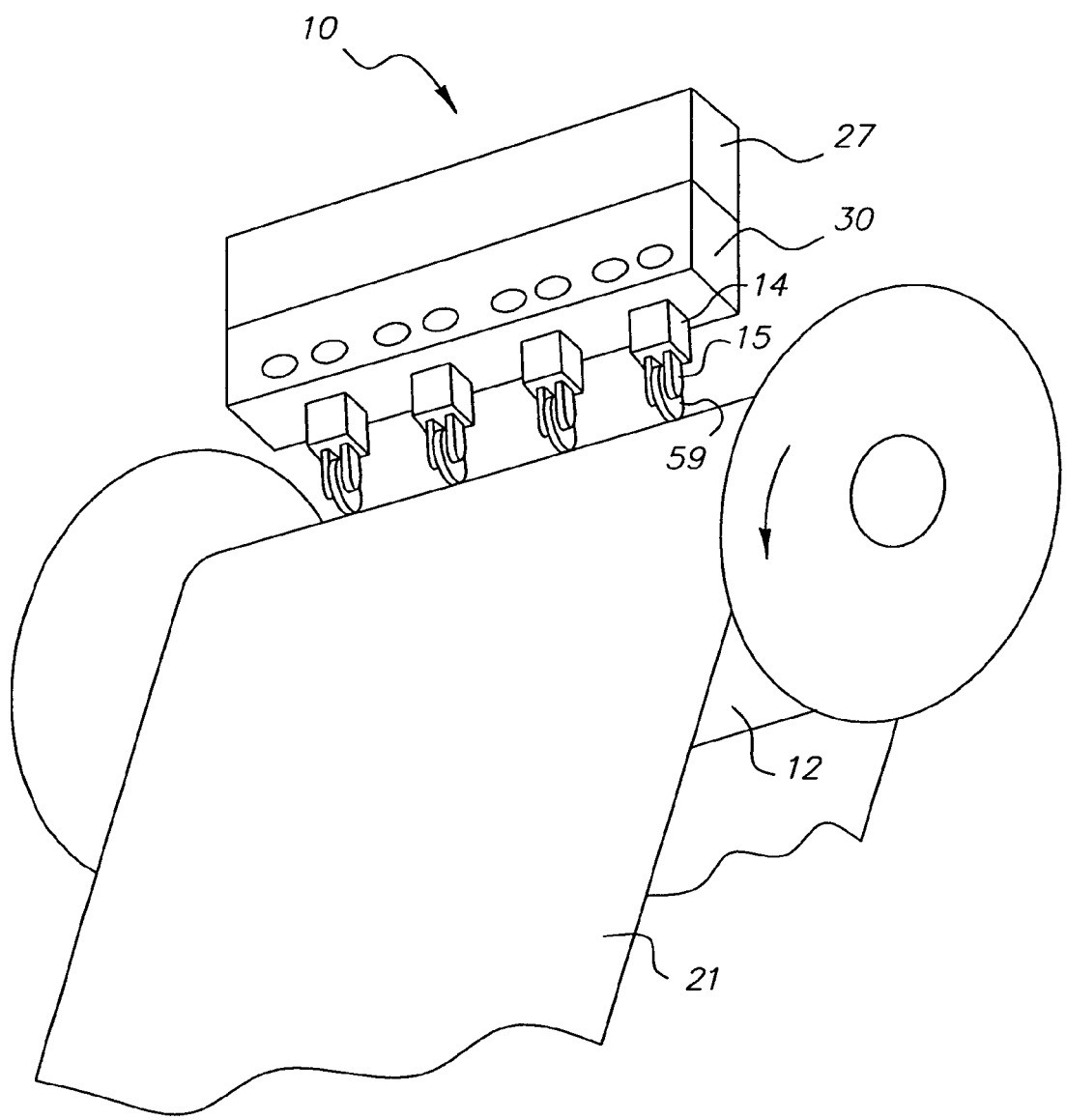
FIG. 5 is a schematic illustration of a skiving assembly.

One or more grouping of at least one nozzle tip 15 and at least one roller 59 can be part of a skiving device 10, as shown in FIG. 5. The device 10 can include at least one roller 59 and at least one nozzle tip 15 mounted in a housing 14. The housing can be any material, for example, metal, wood, ceramic, or a polymer, such as a hard plastic. As shown in FIG. 5, multiple housings 14 can be included in the skiving device. One or more roller, one or more nozzle tip, or both can be present in the skiving device independently from a grouping. The roller or nozzle tip can be in a housing. A housing 14 can extend along either side of roller 59, nozzle tip 15, or the grouping thereof, so long as the housing 14 exposes at least a portion of each roller 59 and nozzle tip 15 therein such that the roller 59, nozzle tip 15, or both can contact the substrate 21. The housing should not extend so far as to interfere with relative movement of the skiving device 10 and substrate 21.

The skiving device 10 can include one or more nozzle tip and one or more roller, wherein each nozzle tip can be the same or different from every other nozzle tip, and each roller can be the same or different from every other roller. Each nozzle tip in a grouping can be the same. Each roller in a grouping can be the same. One or more nozzle tip, roller, or grouping within a skiving device can be arranged linearly, staggered, or in any desirable pattern. The heights of each nozzle tip and roller can be the same or different from every other nozzle tip, roller, or both in a skiving device, in a grouping, or between groupings.

At least one nozzle tip 15 and at least one roller 59 can be held together structurally to form a grouping. For example, a roller and nozzle tip can be held together by a common axis, a housing, a frame, or an alignment block 30, as shown in FIG. 5. The alignment block can maintain alignment of one or more nozzle tips and one or more rollers, or groupings thereof, with respect to the substrate; other nozzle tips, rollers, or groupings; the distance of each nozzle tip or roller from a support for the substrate; or a combination thereof. Use of an alignment block can result in repeatable and precise placement of one or more nozzle tip and one or more roller with respect to the substrate and support. The alignment block can be used within a single skiving device, or can bridge more than one skiving device.

The alignment block can provide a method of attaching nozzle tips 15 and rollers 59 to the skiving device 10. The rollers 59 and nozzle tips 15 can each independently be attached to a frame, set in a housing 14, attached to an alignment block 30, or otherwise placed in skiving device 10.

As shown in FIG. 5, a manifold 27 can be attached to the alignment spacing block 30 to provide a vacuum source for the skiving device 10. The manifold 27 can act as a channel and/or reservoir for material removed by the skiving device 10, and particularly for material removed by one or more nozzle tip 15. All or a portion of the manifold 27 can be heated directly or indirectly to aid in material flow through the manifold 27.

The manifold 27 can optionally include a solvent source such as a spray head to inject one or more solvent into the manifold 27 to aid in flow of the removed material through the manifold. The solvent can be at a temperature sufficient to harden, soften, melt, or dissolve the skived material. Suitable solvents can include solvents capable of hardening, softening, diluting, liquefying, or lubricating the skived material. The solvents can include those that have minimal effect on the nozzle tip material. Suitable solvents can include, for example, alcohols, acids, bases, ammonia-based solvents, bleach-based solvents, water, distilled water, organic solvents, inorganic solvents, air, and surfactants. Different solvents can be used in different portions of the skiving device, for example, in the nozzle tip opening, against the roller surface, in the nozzle tip exit port, or in the manifold. Where different groupings of nozzle tips and rollers are in a skiving device, each grouping can have a different solvent. Each nozzle tip, each roller, or each grouping can be associated with a different solvent, wherein the solvent can be optimized for the material being removed by that nozzle tip, roller, or grouping. The solvent source can be provided elsewhere in the skiving device if no manifold is present.

One or more manifolds can be used, such that each manifold corresponds to one or more grouping in a skiving device when at least two groupings are removing different materials from the substrate. Each grouping, each nozzle tip, each roller, or a combination thereof, can have a separate reservoir for removed material, a separate vacuum source to aid in removing material from the substrate, a separate solvent source, or a combination thereof.

To aid in removing material from the substrate, and to keep material from building up in the nozzle tip or on the roller, a vacuum can be applied from a vacuum source. A common vacuum source can be used if a like vacuum level is desired in all nozzle tips, on all rollers, or to all groupings. Separate vacuum sources can be used where one or more nozzle tips, rollers, or groupings are desired to have a different vacuum level from at least one other nozzle tip, roller, or grouping. Separate vacuum sources can be used where different materials are removed by different nozzle tips, rollers, or groupings. Different vacuum levels can be achieved by various means, including, for example, use of separate vacuum sources, a metered manifold, adjustments to the vacuum configuration, or in-line orifice.

One or more portions of a skiving device, for example, a reservoir, a manifold, a nozzle tip, a roller, or a combination thereof, can be heated or cooled directly or indirectly by electric heat, steam, heat exchanger, or any other heating mechanism to aid in material removal. The heating mechanism can provide temperatures from 0° C. to 100° C. In certain embodiments, higher or lower temperatures can be obtained.

Material skived by the skiving device can be removed from the substrate by gravity; solvent jet, including air or water; or by movement of the skived material through the skiving device. Movement of skived material through the skiving device can be encouraged by use of a solvent or vacuum as discussed elsewhere herein. The vacuum can be formed by any known means. For example, the vacuum can be generated by an air drawn suction system, for example, a turbine. The vacuum pressure can be controlled manually, automated, or a combination thereof. The vacuum pressure can range from 0 to 760 mm Hg. The force exerted by the vacuum on a nozzle tip in the skiving device can range from 0 to an absolute value of 50 N/mm$^2$. Methods of controlling vacuum pressure are known in the art, and can include use of a pressure regulator or valve. The vacuum can be connected to a reservoir for collection and disposal of the removed material. According to certain embodiments, the vacuum apparatus, opening, reservoir, or any combination thereof, can be heated by a heating source, for example, electric heat, a water jacket, or a steam jacket, as stated herein. The vacuum apparatus can include a solvent source as described elsewhere herein.

The skiving device can include a force mechanism to hold each nozzle tip, roller, or grouping against the material to be skived. For example, the skiving device can include a spring, lever, block, weight, other force exerting mechanism, or a combination thereof, to position and hold the nozzle tip, roller, or grouping in relation to the support or substrate. The force mechanism can be gravity. The pressure exerted against the substrate can be from 0 to 55 Kilopascals. The force mechanism can apply pressure to maintain a constant height of the nozzle tip, roller, or grouping with respect to the support. Uniform pressure can be maintained for each nozzle tip, for each roller, for all nozzle tips and rollers, for each grouping, or for any subset thereof. Each nozzle tip, each roller, and each grouping can be made to skive to the same or different depth than other nozzle tips, rollers, and/or groupings in the apparatus. The force mechanism can compensate for variability in support thickness, substrate thickness, or a combination thereof. The force mechanism can compensate for non-uniform movement of the support or substrate. The force mechanism can compensate for wear or the nozzle tips and/or rollers during operation.

Each nozzle tip, roller, or grouping can include an indicia indicating a side of the nozzle tip to face the material to be skived; the location of the nozzle tip, roller, or grouping in the skiving device; or both. Complimentary indicia can be located on the skiving device, for example, on or in an alignment block, manifold, positioning system, or other apparatus contacting the nozzle tip, roller, or grouping. The indicia can be in any form, for example, a line, color, dot, pictogram, lettering, numbers, or a combination thereof. The indicia can be an alignment means, such as a tab/slot interaction, groove, keyway, or other three-dimensional alignment feature. The indicia can be used to place the nozzle tip, roller, or grouping in the correct orientation for skiving. If different nozzle tips, rollers, and/or groupings are used within the skiving device, the indicia can indicate where each should be placed in the device.

According to certain embodiments, each grouping, roller, or nozzle tip in the skiving device can be positioned relative to the edge of the substrate so a material can be removed from a set location on the substrate. Positioning can be by attachment of the roller, nozzle tip, or grouping in the device at a set location, for example, by attachment to a manifold or alignment block at a desired distance from the edge of the substrate. Each nozzle tip, roller, or grouping, independently or in any combination, can be relocateably or permanently positioned in the device. The positioning can be from a leading edge of the substrate, a side edge of the substrate, or both. Each nozzle tip, roller, or grouping can be positionable within the device, for example, by means of a linear slide actuator, spring, lever, or other adjustable mechanism, to place the respective nozzle tip, roller, or grouping in a desired location. Positioning can be done manually, automatically, or by a combination thereof. Positioning systems can include physical or optical guides to assist in locating each nozzle tip, roller, or grouping with respect to the substrate. The skiving device can be portable to assist in positioning relative to the substrate.

The skiving device, or any one or more nozzle tip, roller, or grouping therein, can be moved towards or away from the support by a positioning device. The positioning device can be a linear slide actuator, a linear motor, screw, wedge, pneumatics, hydraulics, or other mechanism capable of planar movement. The positioning device can be used to position one or more nozzle tip, roller, or grouping to maintain a uniform height with respect to the support. Each nozzle tip, roller, or grouping can have the same or a different positioning device. The positioning device can move the skiving device or one or more nozzle tip, roller, or grouping about a pivot point, such that the movement of the skiving device or one or more nozzle tip, roller, or grouping is in an arc with respect to the substrate and support.

An angle positioning mechanism can be used to change the angle at which the skiving device or one or more nozzle tip, roller, or grouping intersects the substrate to be skived. The angle can be changed depending upon the glass transition temperature ($T_g$) of the material being skived; the density of the material; the configuration of the nozzle tip, roller or grouping; drying or hardening rates of the material; vacuum level; and other factors known to those skilled in the manufacturing arts.

An application angle positioning mechanism can be used to move the skiving device around the support where the support is curved, such as a drum or roll. The position desirable for skiving can change depending upon the $T_g$ of the material being skived; the density of the material; the configuration of the nozzle tip, roller or grouping; drying or hardening rates of the material; vacuum level; and other factors known to those skilled in the manufacturing arts.

Each roller and nozzle in a grouping can be moved independently, simultaneously, or in any combination in the grouping by any of the positioning systems. One or more of the positioning systems can be combined into a single system. The system can be manually controlled, automatically controlled, or a combination thereof. Indicia as described herein can be used on one or more of the support, substrate, or skiving device to aid in positioning of the skiving device and each nozzle tip, roller, or grouping in the skiving device, relative to the support and substrate.

As shown in FIG. 5, the support 12 can be any material suitable for carrying the substrate 21 past the skiving device 10. For example, support 12 can be, but is not limited to, a web, conveyor belt, rotating table, translating table, rotating drum, or roll. The support material can be hard enough to provide support for the substrate, and provide resistance against the skiving device 10 without causing damage to the substrate. The support 12 can be, for example, polymeric, metallic, ceramic, glass, fibrous, a composite material, or a combination thereof. According to various embodiments, the support 12 can be at least partially elastic, having some give under the pressure of the skiving device 10. For example, the support 12 can be polymeric, such as polyurethane, polyester, phenolic resin, or composite plastics.

The support 12, the skiving device 10, or both can be movable relative to one another. The support 12 and each nozzle tip 15, roller 59, or grouping, can be movable relative to one another. For example, the support, skiving device, or both can be moved relative to one another to compensate for side-to-side movement or slippage of the substrate. The support or skiving device can be translated to account for movement of the substrate. The support can be designed to minimize movement of the substrate. For example, the support can include a guide, track, groove, or other alignment mechanism to assist in keeping the substrate aligned with respect to the skiving device. For example, the support can have a flanged edge to guide the substrate towards the assembly. According to certain embodiments, the support can be a flanged roller.

Figure 6:
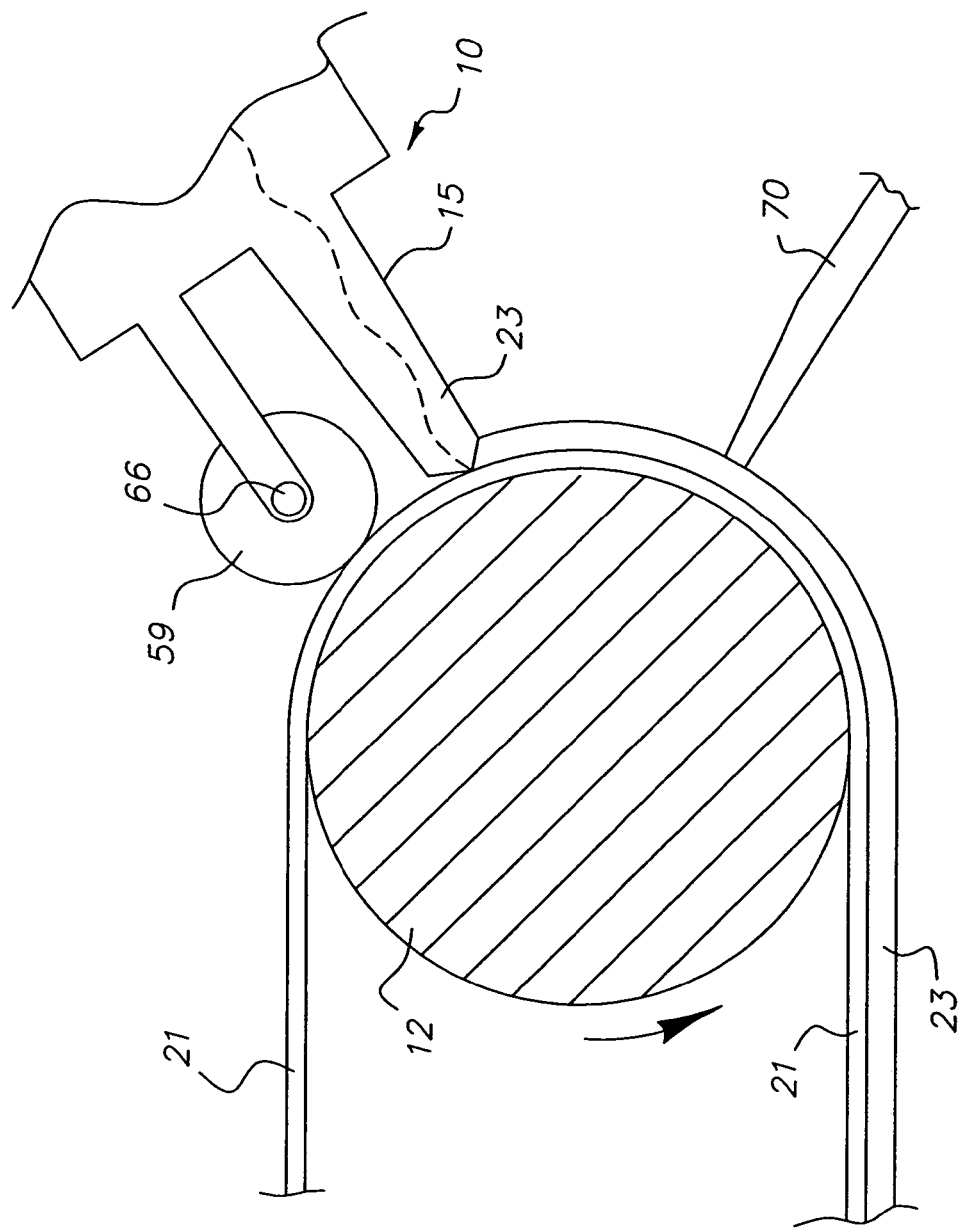
FIG. 6 is a cross-sectional view of a skiving assembly.

As shown in FIG. 6, a skiving device 10 can include one or more solvent dispenser 70 for dispensing one or more solvent onto the material. The solvent dispenser 70 can be a nozzle, opening, slit, spray head, or other known dispensing mechanism. The dispenser can be a separate assembly, or can be located anywhere on the skiving device 10. For example, the dispenser can be part of an alignment block, positioning system, or support for the skiving device 10. The amount of solvent administered can be controlled, for example, by a metering pump, valve, or like mechanism. The mechanism can be operated manually or automated with a timer, computer, automatic controller, other control device, or a combination thereof. The solvent can be capable of softening, removing, or lubricating a desired material from the substrate. Suitable solvents can include, for example, alcohol, acid, base, ammonia-based solvent, bleach-based solvent, water, distilled water, organic solvent, inorganic solvent, air, and surfactant. The solvent dispenser can provide a solvent stream having the same width as the skived area. The solvent dispenser can provide a solvent stream narrower or wider than the skived area as desired. The solvent dispenser can be movable with relation to the substrate, the skiving device, or both. With reference to the direction of material movement, the solvent dispenser can be located prior to, after, or adjacent the skiving device, or any one or more roller, nozzle tip, or grouping in the skiving device. According to certain embodiments, the solvent dispenser can be located before the skiving device, or a roller or a nozzle tip therein, a sufficient distance such that the solvent can soften, liquefy, or lubricate the material to be skived before it reaches the skiving device. The solvent can be delivered at a flow rate sufficient to wet the material without causing movement of the material. A separate solvent dispenser can be associated with one or more nozzle tips, rollers, or groupings in the skiving device, wherein each solvent dispenser can have a different solvent, or different solvent width. The solvent temperature can be raised or lowered.

One or more additional material removal mechanisms can be used in combination with the skiving device. For example, a vacuum tip, doctor blade, skive finger(s), or roller can be used with the skiving device in any configuration. The removal mechanisms can be used to remove material from the substrate, or to clean the substrate prior to or after skiving with the skiving device.

As described herein, many different groupings of one or more roller and one or more nozzle tip can be formed. One or more roller in a grouping can be used to guide one or more associated nozzle tip, to keep the nozzle tip a set height from the substrate, to remove material left behind by the nozzle tip, or a combination thereof. For example, as shown in FIGS. 7A and 7B, a roller 59 can be placed on at least one side of a nozzle tip 15. One or more nozzle tip 15 can be placed either side of a roller 59, as shown in FIGS. 7C and 7D, to clean any material displaced by the roller 59 from the chasm onto remaining substrate 12, or to remove additional material from the substrate 12. A solvent dispenser 70 can be placed before or after the grouping, or can be placed in a grouping between a roller 59 and a nozzle tip 15, as shown, for example, in FIG. 7E. Other combinations of rollers and nozzle tips, in varying numbers, relative heights, and configurations, can be formed, with or without solvent nozzles.

One or more roller, nozzle tip, or a combination thereof can be joined by a common axis. All rollers and nozzle tips in a grouping or in a skiving device can be of one material. A single mold can be used to form two or more nozzle tips or two or more rollers in the skiving device.

The configuration of each grouping effects the chasm created by the grouping in the substrate. The profile of the chasm created by a grouping of the skiving device in the substrate can be determined by the widest point of the skiving device at each height within the chasm. The width of the roller, nozzle tip, or combination thereof wherein one or more roller and nozzle tip are adjacent, determines the width of the skive. Because each roller or nozzle tip in a grouping can be at the same or a different height with respect to the substrate and support from every other roller and nozzle tip, a chasm with a staggered profile can be achieved. When a roller and nozzle tip are used in line, such that one follows the other through the substrate, the wider of the roller or nozzle tip opening can determine the width of the chasm.

The skiving device as described herein allows for accurate removal of a material from one or more predetermined location on a substrate. Use of the skiving device for a roll-to-roll or continuous process can provide improved accuracy of skiving in the web and cross-web directions, especially as compared to prior batch processes. Use of the device can improve the repeatability of the skiving on a substrate because the skiving device and the substrate can be held in continuous registration. The percentage of material removed can be greatly increased over the prior art processes, for example, that described in U.S. Pat. No. 6,469,757. In U.S. Pat. No. 6,469,757, the skiving tip must make 10, 20, or more sequential passes over the same location in order to clean the substrate in the desired path, removing only 2-10% of the material with each pass. The skiving device described herein can remove the material in one pass.

For example, the skiving device can remove at least 90% of the material in a single pass, for example, at least 95%, or at least 98% of the material.

The skiving device can remove material of various viscosities and various hardnesses. For example, materials that are cross-linked, polymerized, chill-set, or otherwise hardened, as well as low-viscosity materials, can be removed by the skiving device in a batch or roll-to-roll process. Skiving methods known previously in the art are not capable of removing hardened materials in a single pass.

Substrates skived with the skiving device can remain undamaged such that any desirable characteristics of the exposed substrate remain unchanged. For example, the exposed substrate can have little or no disturbance of the structure and topography of the unskived portions of the substrate. For example, little or no plowing of the substrate occurs using the roller as described herein. The edges of the chasm in the substrate can be substantially smooth and free of unwanted materials, having a standard deviation of width of the chasm of less than 5%, for example, less than 2%, from the width of the roller face in contact with the substrate. The exposed substrate can maintain other desirable characteristics, including but not limited to physical properties, electrical properties, or fluidic properties. For example, the substrate can exhibit the same electrical conductivity, smoothness, roughness, appearance, or other desired property both before and after skiving as described herein.

In use, the skiving device contacts the material to be removed from the substrate. The material can be displaced to either side of a roller on the substrate, can adhere to the roller and be stripped from the substrate, can be cut through by a nozzle tip, or a combination thereof. Where the material adheres to the roller, the material can adhere loosely or strongly, and can be removed by mechanical forces, such as gravity, a vacuum, a suction nozzle, a skive finger, a doctor blade, a brush, or a combination thereof. The roller can be designed to prevent adhesion of the material, for example, by forming the roller from, or coating at least a portion of the face and/or side of the roller with, a non-stick material, such as Teflon® or Delrin®, or by coating at least a portion of the face of the roller with a surfactant, lubricant, hydrophilic coating, or hydrophobic coating. To encourage adhesion, the roller can be constructed of a tacky material, for example, a polymer, or can be coated with an adhesive. To control adhesion, the roller, substrate, or both can be heated or chilled.

The skiving device as described herein can be used to shape a substrate for various applications. Skiving can be one of many steps in substrate preparation. Skiving can be used to form intricate patterns, such as in making intricate materials, including papers, building materials, or displays, and in forming plates for lithography, intaglio, engraving, or other printing processes. Skiving can be used for making precisely controlled cuts in finished substrates, for example, in slicing, separating, forming perforations, or other cutting operations. Skiving can also be used to prepare a substrate for further steps by removing unwanted material from precise locations on the substrate. For example, in manufacturing liquid crystal displays, a substrate can be formed with a support, a conductive layer such as indium tin oxide, a liquid crystal layer, and a second conductive material. The second conductive material, or the second conductive material and the liquid crystal layer, can be skived in order to expose the liquid crystal layer or the first conductive material, respectively, to allow an electrically conductive path to the first conductive material to be created. The electrically conductive path is needed to create an electrical field to change the polarity of the liquid crystals, enabling use as a display. The liquid crystal layer can comprise more than one layer of liquid crystals. The liquid crystal material can be nematic, smectic, ferroelectric, cholesteric, or a combination thereof. Other types of imaging elements can be made using the skiving device described herein, including, for example, light emitting diodes, organic light emitting diodes, electrophoretic materials, electrochromic materials, reflective print materials, and bichromal materials. The imaging elements can be used in electronic shelf labels, sign displays such as used in stores, signage, viewscreens, or other display applications.

Skiving can be done in the web direction, which is the direction of movement of the substrate, or in a cross-web direction, which is any direction not parallel the direction of movement of the substrate. According to various embodiments, skiving can be done in both a web direction and a cross-web direction simultaneously. Skiving can be controlled to form any desired shape in a substrate, for example, a linear or curved shape. Skiving can be performed in one or more phases of substrate preparation, with or without intermediate steps, such as coating. Other material removal systems can be used in combination with the skiving assembly described herein.

Figure 8:
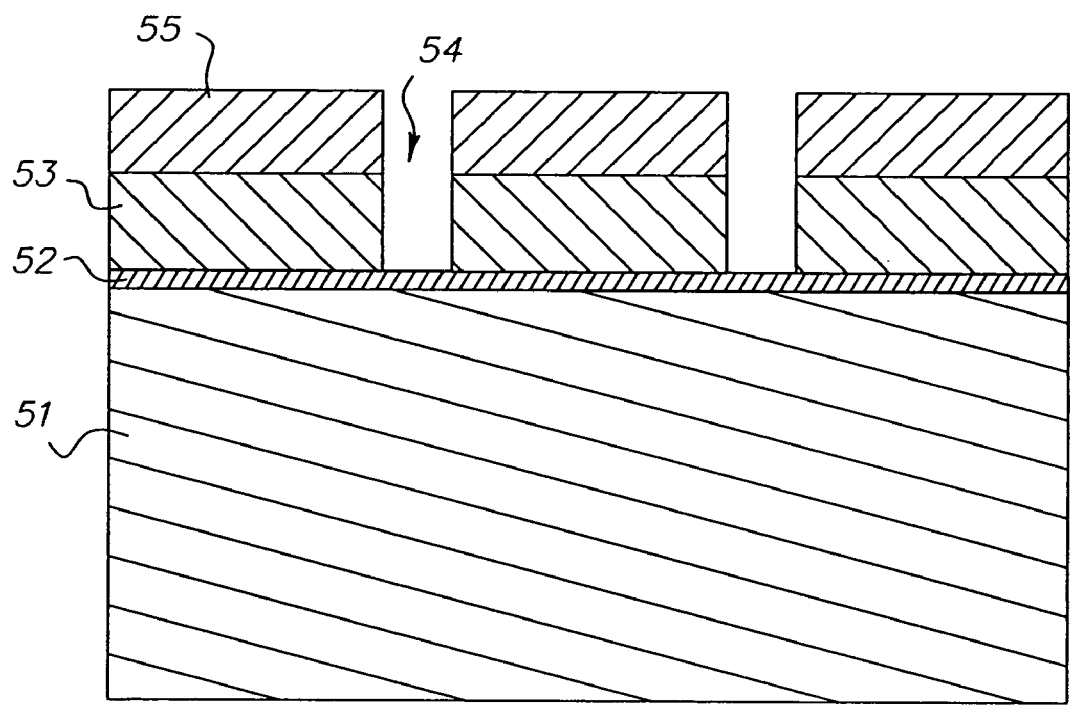
FIG. 8 depicts a substrate with one or more layers selectively removed by a skiving device.

In use, the skiving device herein can be used in a batch or roll-to-roll manufacturing process. For example, a liquid crystal display can be made using the skiving device and according to the methods described herein. As shown in FIG. 8, a support 51 can be formed of glass, or a flexible material, for example, polyethylene terephthalate. The support 51 can be coated with a first conductive layer 52, for example, indium tin oxide. The first conductive layer 52 can be coated with a liquid crystal dispersion 53, for example, an aqueous coating of a liquid crystal emulsion in a binder, such as gelatin. The liquid crystal layer 53 can be chill-set or otherwise hardened. A second conductive layer 55 can be formed over the liquid crystal layer, for example, coating in a layer or a pattern. The skiving device as described herein can be used to remove the second conductive layer 55 and the liquid crystal layer 53 in one pass, forming chasms 54 as shown in FIG. 8.

EXAMPLES

Figure 9A:
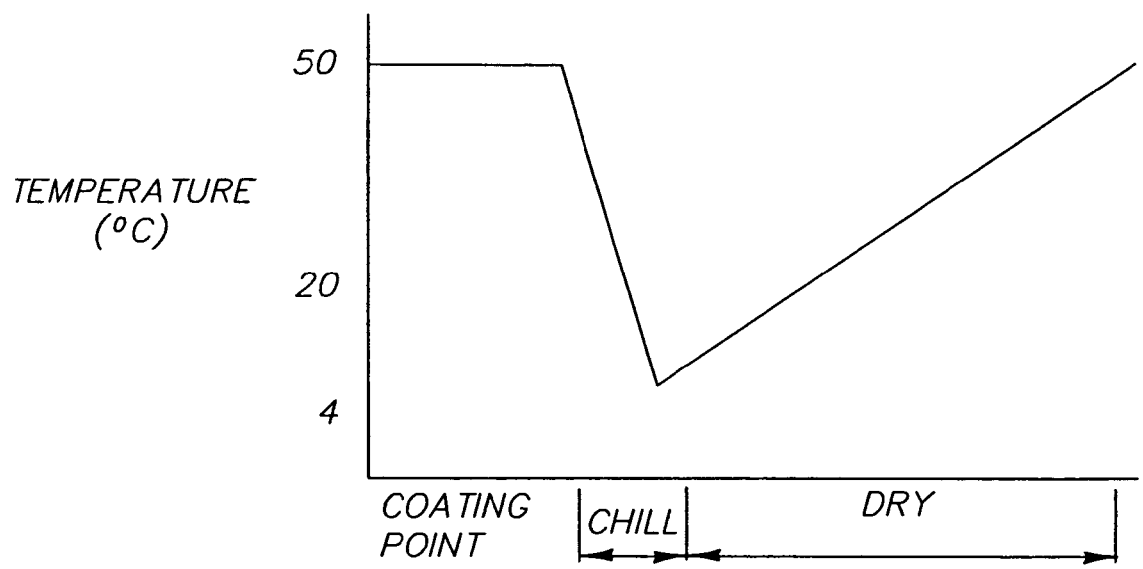
FIG. 9A depicts a coating process timeline with reference to temperature.
Figure 9B:
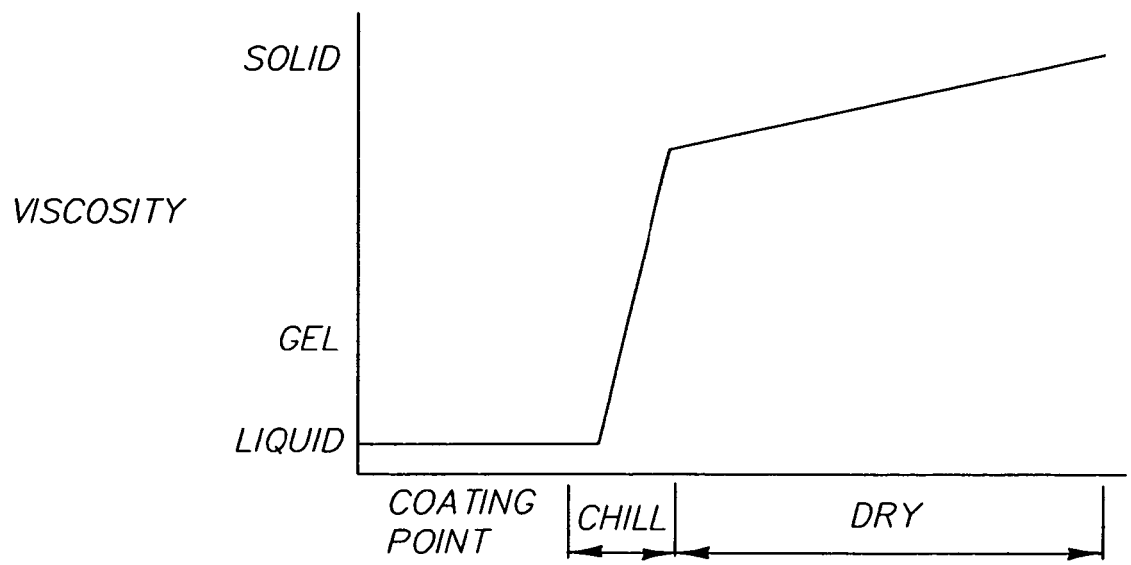
FIG. 9B depicts a coating process timeline with reference to viscosity.
Figure 9C:
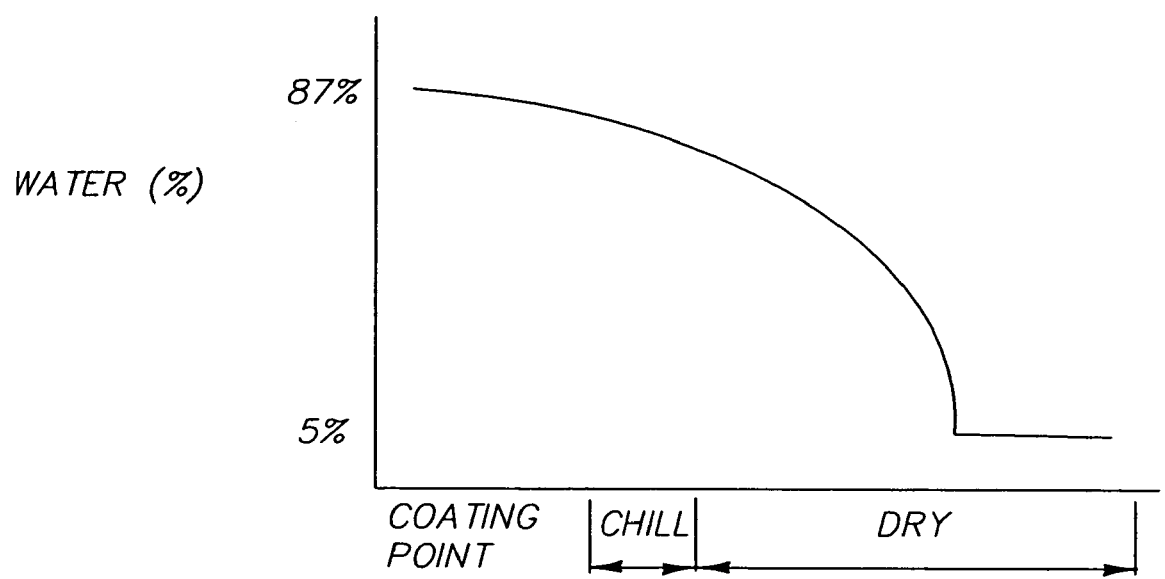
FIG. 9C depicts a coating process timeline with reference to percent solids.

For all of the following examples, a roll-to-roll coating machine was used to prepare the samples. The coating machine had parameters as set forth in FIGS. 9A-9C. Materials used herein include Rulon LD from Dixon Industries Corp., Water North Bennington, Vermont; Delrin® and Teflon® from E.I. Dupont de Nemours and Company; the substrate with Indium Tin Oxide on a polyethylene terephthalate support was from Bekaert Specialty Films, LLC, San Diego, Calif.; and 316 stainless steel, pigments, and gelatin were obtained from Eastman Kodak Company, Rochester, N.Y.

A two-gelatin coating pack was applied by a slide hopper to a 250-Angstrom thick conductive layer on a 120-micron polyethylene terephthalate substrate. The first gelatin layer comprised 3 wt % gelatin and 8 wt % droplets of ten micron diameter dibutylsebacate mixed with bisvinylsulfonylmethane hardener at 3% relative to the total amount of gelatin. The first gelatin layer was applied to the substrate at 61.46 ml/m². The second gelatin layer comprised 4 wt % gelatin containing a mixture of pigments formulated to provide a neutral black density, and was applied to the substrate at 10.76 ml/m². The resulting coated layers were cooled to a temperature less than 7 degrees Celsius to chillset the gelatin, then dried at 20 degrees Celsius. The coated gelatin layers had a combined total thickness of 3.5 microns.

A portable skiving unit having one skiving assembly was used. The skiving assembly was relocatable within the coating machine. In the examples, the skiving assembly was located at one of two positions in the coating machine. One position was in the chilling section where the pack property of the coated layers was 11 wt % solids, and the second position was in the dryer section where the pack property of the coated layers was 20 wt % solids. Skiving trials were conducted with the coating and skiving occurring while the substrate moved through the coating machine at 10.67 meters per minute.

In all skiving assemblies including a nozzle tip, the nozzle tip was made of Teflon® from E.I. Dupont de Nemours and Company, Delaware, and the edges were radiused. The inner diameter of the nozzle tip was 3.175 mm. The nozzle tip length was 31.75 mm. The first face angle α was 90 degrees, and the second face angle β was 45 degrees. The width of each face was measured across each face in a direction perpendicular to the direction of web movement. The width of the first face was 1.50 mm, and the width of the second face was 1.52 mm. The face length was measured across each face in the direction of web movement. The first face length was 0.58 mm, and the second face length was 2.49 mm. The height of the first face was measured from the surface of the substrate to the outer edge of the first face, and was 0.50 mm. The total nozzle tip area, which is the combined area of both faces of the nozzle tip, was 6.46 mm². The tip angle relative to the support was 64 degrees. A vacuum was applied to the nozzle tip at a level of 20.32 cm Hg, applying a force of 0.281 kg/cm² to the nozzle tip.

Example 1

An experiment to ascertain the most effective configuration and location of a combination skiving unit was conducted. The desired width of the skive was the width of the roller, 3.175 mm. The roller was a radiused edge Delrin®. The inner diameter of the nozzle tip and the width of the roller used in the skiving assembly were the same.

In Table 1, the skiving method and location are qualitatively ranked in terms of the resulting skive quality. The skive quality was determined by the effectiveness of removing the desired coated materials, the width of the resulting skive, and the height of the resulting skive edge. The effectiveness of removing the materials was a function of the quantitative amount of material removed, and the visual appearance of the edges of the chasm along the skived area. The edge height was the amount of build-up on top of the material that remained after skiving, as measured from the bottom of the skived area to the top of the edges along the chasm.

Figure 10A:
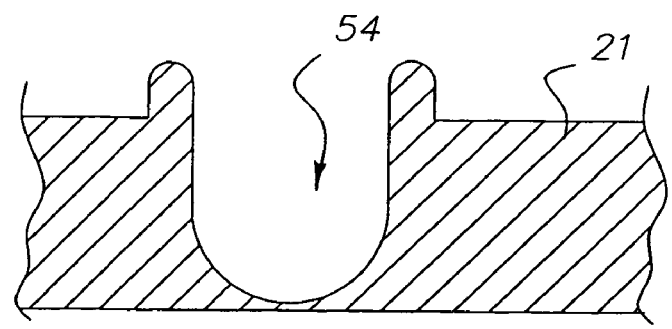
FIG. 10A illustrates a poor skiving profile.
Figure 10B:
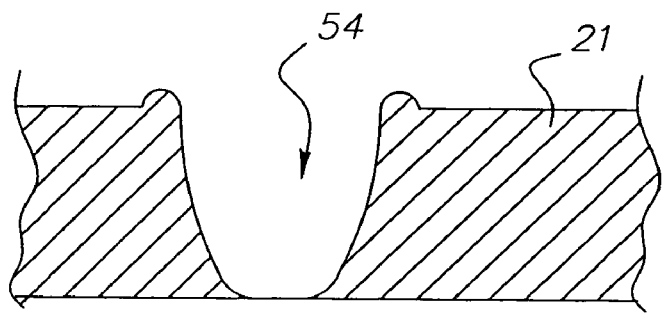
FIG. 10B illustrates a fair skiving profile.
Figure 10C:
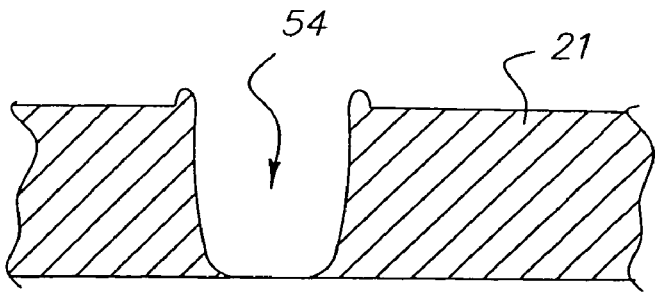
FIG. 10C illustrates a good skiving profile.
Figure 10D:
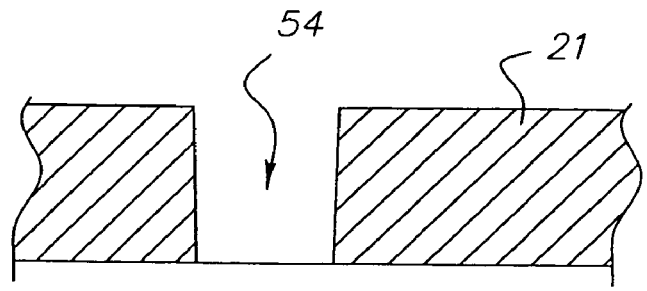
FIG. 10D illustrates an excellent skiving profile.

Poor skive quality refers to incomplete or no removal of the coated material, very narrow and unacceptable skive width, or very high and unacceptable skive edge height of the substrate 21 next to the chasm 54 as shown in FIG. 10A. Fair skive quality refers to partial removal of the coated material, narrow width, or medium to high skive edge height of the substrate 21 next to chasm 54 as shown in FIG. 10B. Good skive quality refers to minimal residual material remaining in the skived area, the desired skive width, and minimal to no edge height of the substrate 21 next to chasm 54 as shown in FIG. 10C. Excellent skive quality refers to no residual material in the skived area, the desired skive width, and no edge height of the substrate 21 next to chasm 54 as shown in FIG. 10D.

The conductivity of the exposed conductive layer was measured using a Fluke Multimeter to determine if the conductive layer was scratched during the skiving process. This, combined with the skive quality, provided an overall result. A good overall result indicates that both the skiving quality is acceptable and the conductive layer is not scratched. A poor overall result is due to either unacceptable skiving quality or the conductive layer being scratched during the skiving process.

TABLE 1

| Sample | Method | Location by % solids | Skive Quality | Skive Width (mm) | Scratched Conductive Layer | Overall Result |
|---|---|---|---|---|---|---|
| 1C | Nozzle Tip | 11% | Excellent | 2.75 | Yes | Poor |
| 2C | Roller | 11% | Poor | 2.79 | No | Poor |
| 3I | Nozzle Tip + Roller | 11% | Poor | 2.92 | No | Good |
| 4I | Nozzle Tip + Roller | 20% | Good | 3.05 | No | Good |
| 5I | Roller + Nozzle Tip | 11% | Fair | 2.72 | No | Good |
| 6I | Roller + Nozzle Tip | 20% | Good | 3.10 | No | Good |

Comparative sample 1C using a vacuum nozzle tip only resulted in excellent skive quality, but scratched the conductive layer on the substrate. Comparative sample 2C using a roller only resulted in poor skive quality, but did not scratch the conductive layer. Inventive samples 3I-6I using a combination of either the nozzle tip followed by the roller (3I and 4I), or the roller followed by the nozzle tip (5I and 6I) resulted in acceptable skive qualities and did not scratch the conductive layer. Samples 3I and 5I had poor or fair skive qualities, respectively, due to edge quality and incomplete removal of the coated materials. This was overcome in samples 4I and 6I by moving the location of the skive point to the dryer.

Example 2

Using a skiving assembly of a nozzle tip followed by a roller, an experiment was conducted to evaluate the impact of vacuum level, a force applied to the skiving assembly in the direction of the substrate by a spring, roller geometry, and roller material on skiving quality. For inventive samples 7I-9I and 14I-17I, the roller was 3.175 mm wide with a 19.05 mm diameter. For inventive samples 10I-13I, the roller was 2.54 mm wide with a 19.05 mm diameter. The desired width of the skive was the width of the roller. The roller configurations are set forth in Table 2, and correspond to those described elsewhere herein. A mounted skiving unit having three identical skiving assemblies was installed in the dryer section of the coating machine where the pack property of the coated layers was 20 wt % solids for this example. A ratio of the internal diameter of the nozzle tip to the roller width is set forth in the table. Results are shown in Table 2.

TABLE 2

| Sample | Vacuum (cm Hg) | Force (kg) | Roller | Ratio Tip to Roller | Skive Quality | Skive Width (mm) | Scratched Conductive Layer |
|---|---|---|---|---|---|---|---|
| 7I | 3.38 | 0.078 | Radiused Delrin | 1:1 | Excellent | 3.12 | Yes |
| 8I | 7.62 | 0.078 | Radiused Delrin | 1:1 | Good | 2.99 | Yes |
| 9I | 12.7 | 0.078 | Radiused Delrin | 1:1 | Good | 2.91 | Yes |
| 10I | 2.54 | 0.078 | Radiused Delrin | 1.25:1 | Excellent | 3.07 | Yes |
| 11I | 2.54 | 0.039 | Radiused Delrin | 1.25:1 | Excellent | 2.45 | Yes |
| 12I | 1.70 | 0.039 | Radiused Delrin | 1.25:1 | Excellent | 2.40 | Yes |
| 13I | 0.84 | 0.039 | Radiused Delrin | 1.25:1 | Excellent | 2.36 | Yes |
| 14I | 1.70 | 0.013 | Channeled Delrin | 1:1 | Fair | 1.70 | No |
| 15I | 1.70 | 0.013 | smooth stainless steel | 1:1 | Good | 3.00 | No |
| 16I | 1.70 | 0.013 | patterned stainless steel | 1:1 | Good | 3.00 | No |
| 17I | 1.70 | 0.013 | smooth Rulon | 1:1 | Poor | 2.86 | Yes |

Samples 7I-9I yielded good to excellent skive quality, but scratched the conductive layer. Samples 10I-13I having a nozzle tip:roller ratio greater than one resulted in an excellent skive quality, indicating there is an advantage to having the roller width less than the inner diameter of the nozzle tip. As shown by Examples 8I and 9I versus 7I, increasing the vacuum level while maintaining a constant force on the nozzle tip resulted in a degradation of the skive quality.

Samples 11I-13I produced an excellent skive quality, but scratched the conductive layer. Because the force on the nozzle tip was held constant, it can be determined that the vacuum level effects the skive width, and possibly effects scratching of the conductive layer.

Samples 14I-16I used alternative roller geometry and materials. The results achieved with sample 14I indicate the geometry of the roller, more than the material used, impacts the skive quality (compare to samples 7I-13I). At constant vacuum and force levels, different geometries or materials do not appear to cause different effects with regard to scratching of the conductive layer. Sample 16I produced poor results because the friction between the roller and the substrate was insufficient to turn the roller at the proper relative speed, resulting in the roller dragging on the substrate and scratching it. It is believed this roller material can work properly with other substrates or at other relative skiving speeds.

In addition to the samples listed above, several of the sample configurations were rerun with a solvent mixture of glycerin and water applied to the substrate before skiving. No benefit to skive quality was seen when using the solvent. Several of the sample configurations in Table 2 were rerun using nozzle tips made of Delrin® (E.I. Dupont de Nemours and Company, Delaware) instead of Teflon®, yielding comparable results.

Depending on the desired result from the skiving, the quality of the skive or scratching of the substrate during the skiving process may have varying importance, thus, overall quality of the skive was not ranked.

Example 3

Using a skiving assembly wherein the nozzle tip precedes the roller, the effect on skiving quality of a force applied to the nozzle tip by a spring during skiving was studied. A mounted skiving unit having three identical skiving assemblies was installed in the dryer section of the coating machine where the pack property of the coated layers was 20 wt % solids. For Inventive Samples 18I-23I, the roller was made of Delrin® with a radiused edge, and was 2.54 mm wide and had a 19.05 mm diameter. The ratio of the internal diameter of the nozzle tip to the roller width was 1.25:1 for all samples. The desired width of the skive was the width of the roller.

TABLE 3

| Sample | Vacuum Level (cm Hg) | Force (kg) | Skive Quality | Skive Width (mm) | Scratched Conductive Layer |
|---|---|---|---|---|---|
| 18I | 1.70 | 0.033 | Excellent | 2.82 | Yes |
| 19I | 1.70 | 0.026 | Excellent | 2.63 | Yes |
| 20I | 1.70 | 0.020 | Excellent | 2.39 | No |
| 21I | 1.70 | 0.013 | Excellent | 2.29 | No |
| 22I | 1.70 | 0.007 | Good | 2.12 | No |
| 23I | 1.70 | 0 | Good | 2.06 | No |

The results in Table 3 show a degradation in the skive quality as the force level is lowered, indicating the amount of force applied on the nozzle tip has an impact on whether the conductive layer is scratched, and on the width of the skive. Further, the force applied must be tempered in order to achieve a good skive quality without being so high as to scratch layers underneath. Again, depending on the skiving application, damage to layers exposed by skiving may or may not be an important consideration.

Example 4

Using the skiving assembly of Example 3, a coated display substrate was prepared as described above, except the first gelatin layer was replaced a 3 wt % gelatin having 8 wt % of ten micron diameter MERCK BL118 droplets of cholesteric liquid crystal oil, available from E.M. Industries of Hawthorne, N.Y. The display substrate was skived with a vacuum of 1.7 cm Hg and a force of 0.013 kg, yielding a display substrate with no defects due to scratching of the conductive layer or poor edge height along the edges of the chasm. A second conductive layer was added over the gelatin pack, resulting in a fully functional cholesteric liquid crystal display.

The invention has been described in detail with particular reference to certain embodiments thereof. Variations and modifications can be effected within the spirit and scope of the invention.

PARTS LIST

10 Skiving Device
12 Support
14 Housing
15 Nozzle Tip
16 Opening
21 Substrate
23 Material
27 Manifold
30 Alignment block
37 First face
38 Second face
39 Proximal end
40 Distal end
41a First face edge
41b Second face edge
51 Support
52 First conductive layer
53 Liquid crystal layer
54 Chasm
55 Second conductive layer
59 Roller
60 Pattern
61 Portion of Roller Face
62 Center Portion
63a,b Side Portion
64 Channel
65 Edge
66 Axis
67 Side of Roller
68 Face of Roller

PARTS LIST (CONT.)

70 Solvent dispenser
α Angle of first face from longitudinal axis
β Angle of second face from longitudinal axis
θ Angle of bevel
d Diameter of opening
h Height of first face
L Nozzle tip length
l Length of nozzle tip face
a Axis of rotation
$W_n$ Width of nozzle tip face
$W_r$ Width of roller
r Radius

The invention claimed is:

1. A display comprising a substrate, wherein the substrate comprises a light modulating material, wherein the display is formed by:
providing the substrate, wherein the substrate comprises a light modulating material, to a skiving device comprising at least one roller having a surface and at least one nozzle tip;
contacting the surface of at least one roller and at least one nozzle tip with the light modulating material; and
moving the skiving device in relation to the substrate to skive at least a portion of the light modulating material in contact with at least one roller, at least one nozzle tip, or both.

2. The display of claim 1, wherein at least one nozzle tip comprises a proximal end, a distal end, and a longitudinal axis extending from the proximal end to the distal end, the proximal end having an opening defined by a first edge and a second edge.

3. The display of claim 2, wherein the first edge of the nozzle tip is at an angle of from 20 degrees to 90 degrees relative to the axis.

4. The display of claim 2, wherein the second edge of the nozzle tip is at an angle of from 15 degrees to 70 degrees relative to the axis.

5. The display of claim 1, wherein the light modulating material is chill-set, hardened, polymerized, or a combination thereof.

6. The display of claim 1, wherein the light modulating material comprises liquid crystals, electrophoretic material, electrochromic material, bichromal materials, or a combination thereof.

7. The display of claim 1, wherein the light modulating material comprises liquid crystals selected from cholesteric, nematic, ferroelectric, and smectic liquid crystals, or a combination thereof.

8. The display of claim 1, wherein the substrate further comprises a conductive material below the light modulating material.

9. The display of claim 8, wherein the conductive material is tin oxide or indium tin oxide.

10. The display of claim 8, wherein the conductive material is transparent.

11. The display of claim 1, wherein the skiving device further comprises a vacuum source.

* * * * *